Sept. 23, 1947.  O. A. KEHLE  2,427,788
FLOW REVERSING VALVE FOR HYDRAULIC SYSTEMS
Filed Nov. 2, 1942  4 Sheets-Sheet 1
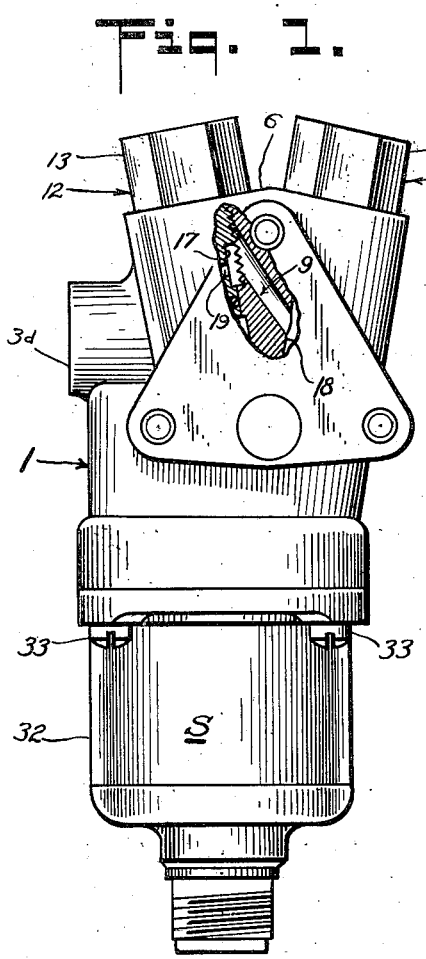
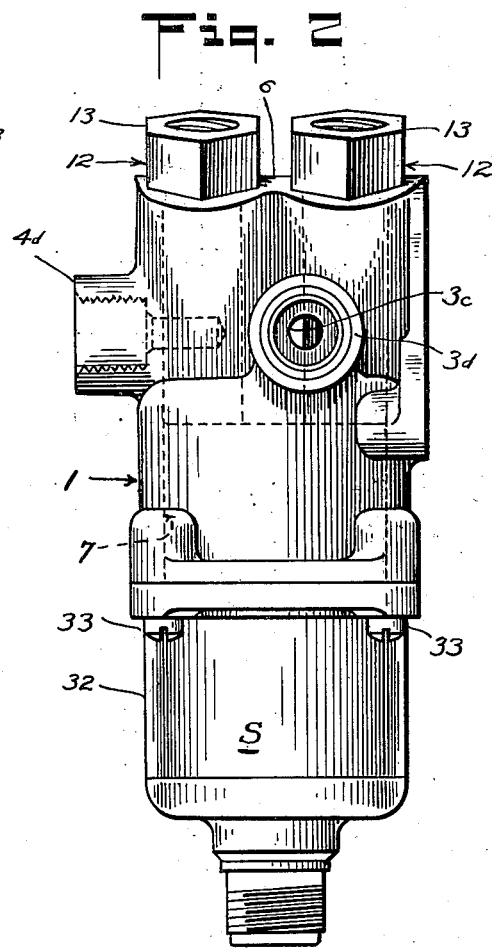
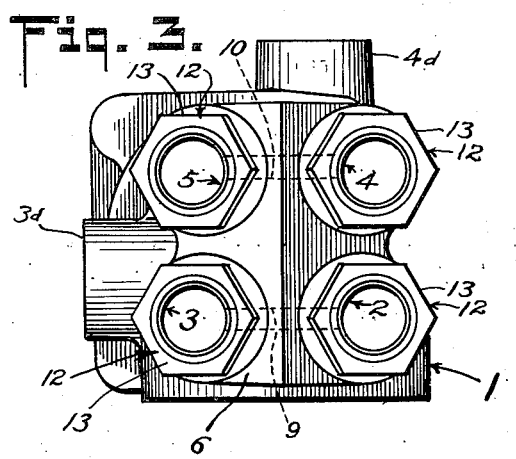
Inventor
OTTMAR A. KEHLE

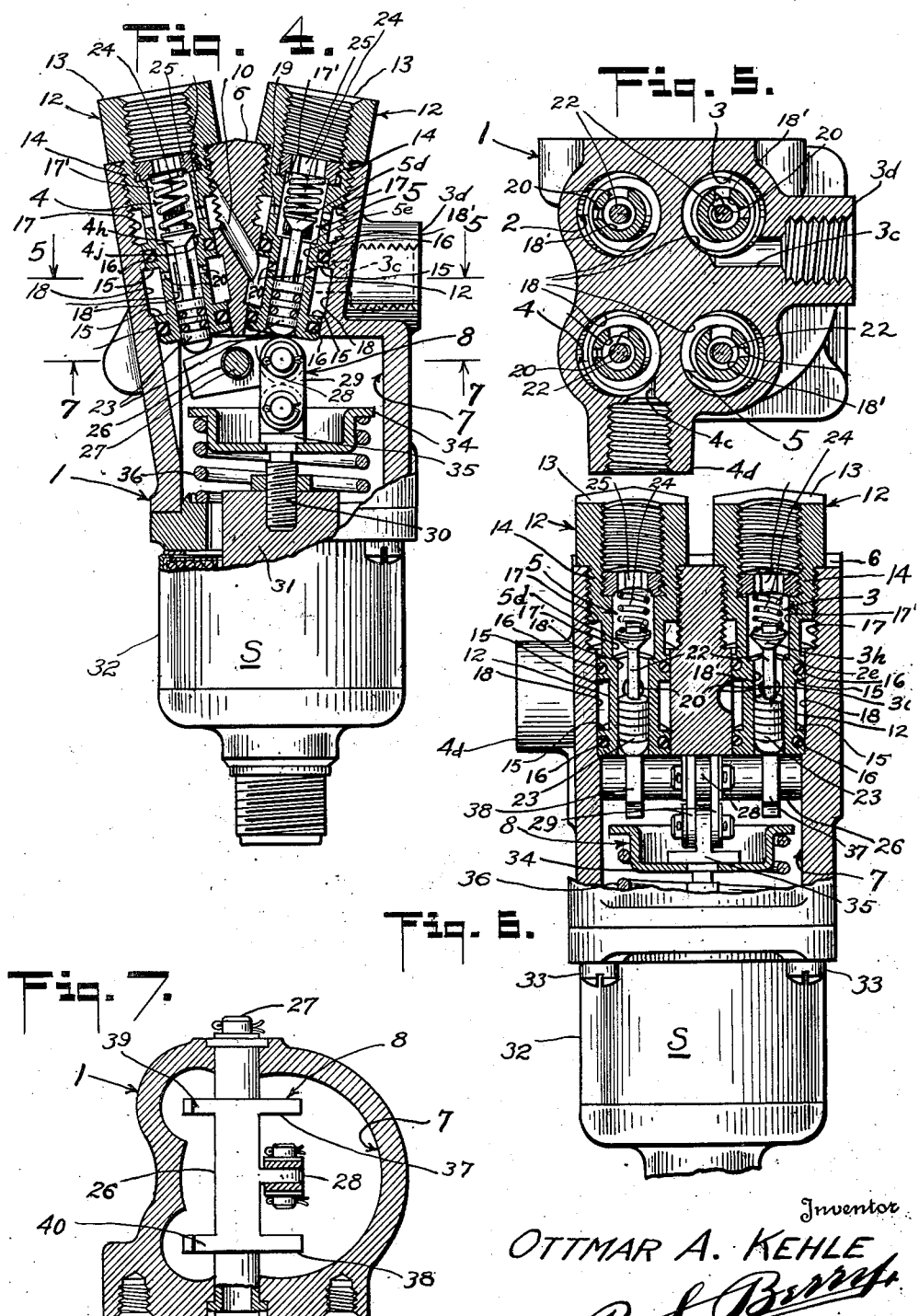

Inventor
OTTMAR A. KEHLE
By R. S. Berry
Attorney

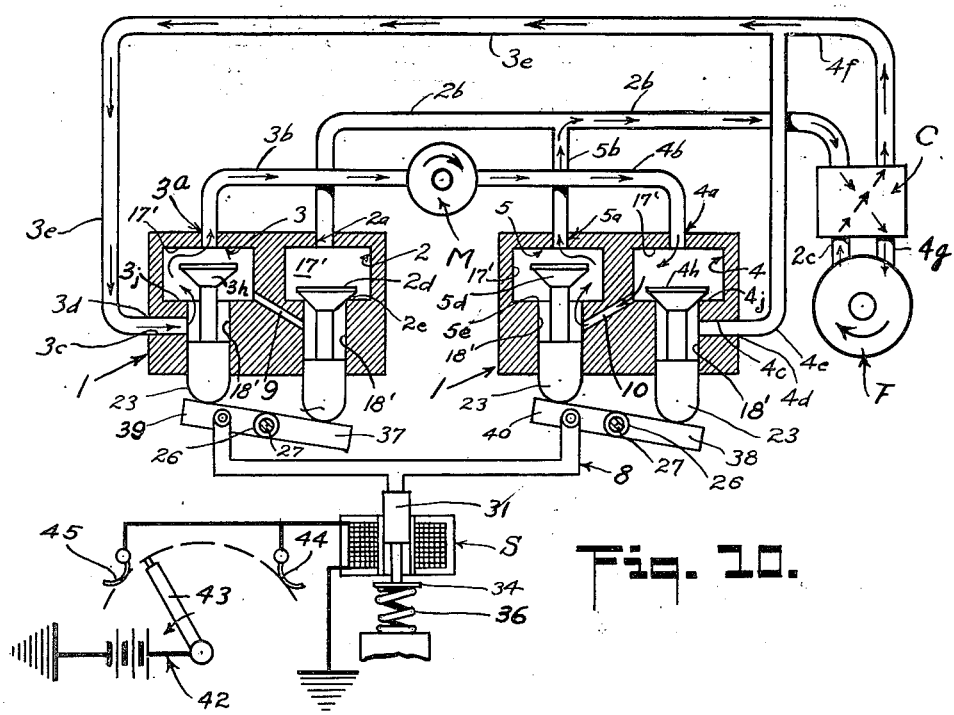

Patented Sept. 23, 1947

2,427,788

UNITED STATES PATENT OFFICE 2,427,788

FLOW REVERSING VALVE FOR HYDRAULIC SYSTEMS

Ottmar A. Kehle, West Los Angeles, Calif., assignor to Adel Precision Products Corp., a corporation of California Application November 2, 1942, Serial No. 464,278

1 Claim. (Cl. 137—144)

This invention has for its primary object the provision of an efficient and reliable reversing valve for controlling hydraulically actuated gun turrets in aircraft so as to confine the elevating and deflecting movements of the gun to safe limits for the particular aircraft.

The reversing valve of my invention is designed for use in connection with hydraulically operated gun turrets wherein the hydraulic motor for moving the turret is controlled by a manually operated 4-way hydraulic valve, and the purpose of my valve is to automatically and repeatedly momentarily reverse the flow of hydraulic fluid to the motor when the turret and gun reach a predetermined position while the 4-way control valve is operative to direct the hydraulic flow, whereby the turret is given a small oscillatory or vibratory movement at and adjacent said predetermined position until the operator reverses the 4-way control valve or returns it to neutral thereby preventing severe shocks and limiting the deflection and elevation of the gun to safe limits for the particular aircraft.

Another object of my invention provides a reversing valve of the character described which is electrically operated to effect an instantaneous reversal of flow of the hydraulic fluid and constructed and arranged to insure ample flow of hydraulic fluid with a low pressure drop whereby the valve will operate in a highly efficient and reliable manner for the purpose hereinbefore noted.

A further object is to provide an electrically operated valve such as described which is simple as to construction, light as to weight and exceptionally small and compact with the valve members and ports therein constructed and arranged so that the valve may be readily connected in a hydraulic system such as described without necessitating appreciable changes in the system or requiring many additional connections and flow lines and consequent complications of the system.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a front elevation of a reversing valve embodying my invention;

Fig. 2 is a side elevation of the valve;

Fig. 3 is a top plan view of the valve;

Fig. 4 is a fragmentary vertical section of the valve;

Fig. 5 is a horizontal sectional view taken on the line 5—5 of Fig. 4;

Fig. 6 is a fragmentary sectional view taken at right angles to Fig. 4;

Fig. 7 is a cross sectional view taken on the line 7—7 of Fig. 4;

Fig. 10 is a schematic view of the system shown in Fig. 8 as when the 4-way control is set to rotate the motor clockwise;

Fig. 11 is a view similar to Fig. 10 showing the reversing position of the reversing valve as when the control valve is set as shown in Fig. 10.

Figure 8:
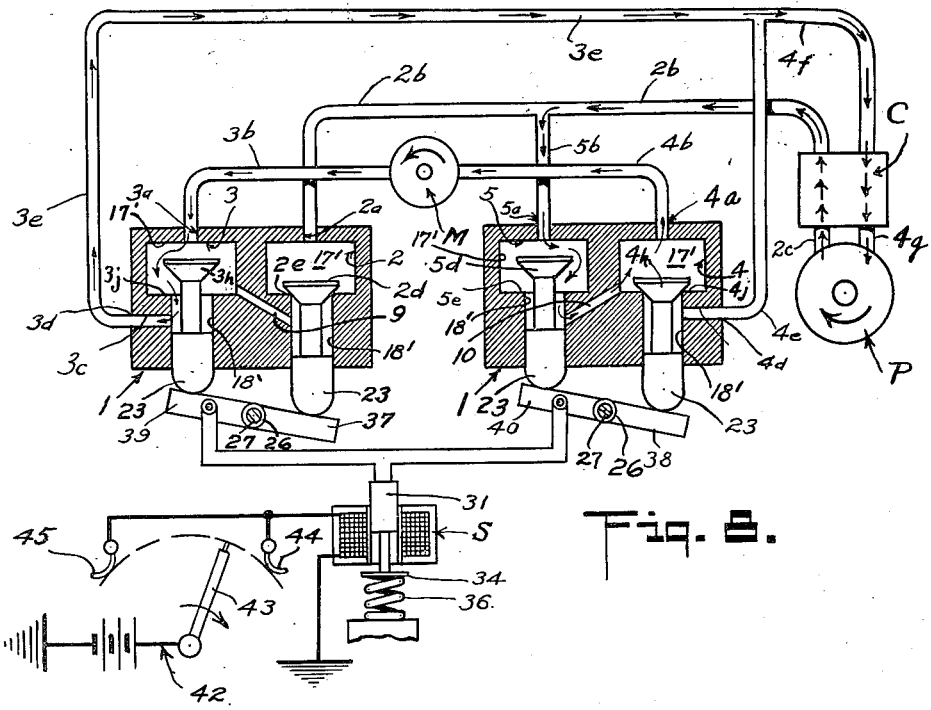
Fig. 8 is a diagrammatic view of a hydraulic system in which my reversing valve is employed, showing the valve in one of its two positions when the control valve is set to rotate the motor counterclockwise.

One embodiment of my improved valve as shown in detail in the accompanying drawings, includes a valve body member 1 in the form of a casting having four valve receiving bores designated 2, 3, 4 and 5 and opening at their outer ends at the outer surface 6 of the body member and at their inner ends into a chamber 7 for valve operating means generally designated 8.

Figure 9:
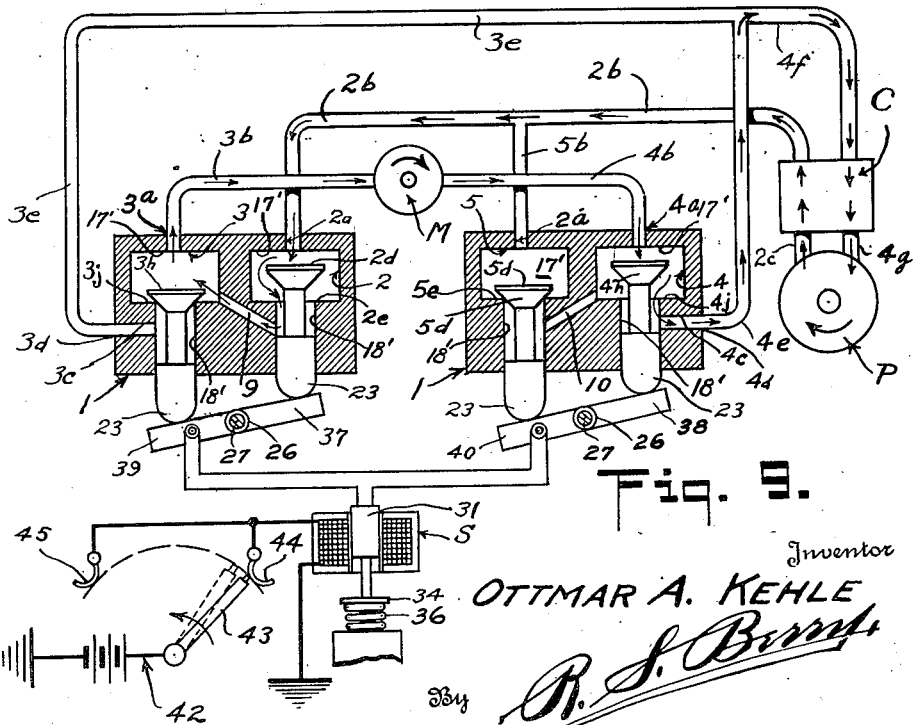
Fig. 9 is a diagrammatic view similar to Fig. 8 showing my valve in the other of its two positions as when a flow reversing operation thereof, compared to Fig. 8, takes place.

Ports 2a and 5a are provided at the outer ends of bores 2 and 5 respectively. As shown in Figs. 8 and 9, port 2a is adapted to be connected to a line 2b leading to a 4-way hydraulic control valve C, from which a line 2c leads to the pressure side of a hydraulic pump P, whereas port 5a is adapted to be connected by means of a line 5b to the line 2b leading to valve C.

Motor ports 3a and 4a are provided at the outer ends of the bores 3 and 4 respectively and, as shown in Figs. 8 and 9, port 3a is adapted to be connected by means of a line 3b to a hydraulic motor M for operating the motor in one direction, whereas fluid for operating the motor in the other direction is passed from port 4a through line 4b to said motor.

A port 4c leads, as shown in Fig. 5, from the bore 4 through the body 1 and opens into a line connection 4d on one side face of the body. From the connection 4d a line 4e (as shown in Figs. 8 and 9) leads to a return line 4f leading to the 4-way valve C. A return line 4g leads from the valve C to the pump P.

A port 3c (as shown in Fig. 5) leads from the bore 3 through the body 1 and opens into a line connection 3d on a side face of the body at right angles to the side face supporting the connection 4d. The connection 3d (as shown in Figs. 8 and 9) provides for connection of the port 3c to a return line 3e which in turn is connected to the line 4f leading to the control valve C.

An intercommunicating port 9 (as shown in Figs. 1, 3 and 8) is provided in the body 1 to communicate the outer end of the bore 3 with the inner end of the bore 2, whereas a similar port 10 leads from the outer end of bore 4, as shown in Figs. 1, 4 and 8, to the inner end of the bore 5.

Poppet valves 2d and 5d are arranged in the bores 2 and 5 to control the flow of pressure fluid through bores 2 and 5. Valve 2d has its seat 2e between the ports 2a and 9 in bore 2 so that when open (as shown in Fig. 9), the pressure fluid will flow through port 9 into bore 2 and out through motor port 2a and line 2b to operate motor M in one direction (clockwise). Valve 5d has its seat 5e located between the ports 5a and port 10 in bore 5 so that when open (as shown in Fig. 8) the pressure fluid will flow through port 10 into bore 4, and thence through motor port 4a and line 4b to operate the motor in the opposite direction counter-clockwise).

As shown in Fig. 8, the motor is rotating counter-clockwise and the line 3b returns fluid from the motor to bore 3 where it returns to the pump through port 3c, return line 3e, line 4f, control valve C and line 4g. When the motor is rotated clockwise (as shown in Fig. 9), the line 4b returns fluid to bore 4 where it flows to the pump P through return port 4c, and lines 4e and 4f, valve C and line 2c.

Poppet valves 3h and 4h are arranged in the bores 3 and 4 to control the return of fluid from the motor to the pump. Valve 3h has its seat 3j located in bore 3 between the return port 3c and the motor port 3a, while valve 4h has its seat 4j in bore 4 between motor port 4a and return port 4c.

Each of the poppet valves 2d, 3h, 4h and 5d is identical as to construction and as best shown in Figs. 4 and 6 is contained in a cylindrical cartridge or shell 12 which is open at both ends. The outer open end 13 of the shell provides one of the hereinbefore designated motor or pressure ports as the case may be, and is internally screw threaded to serve as a connection for one of the pipe lines of the system.

Next to the end 13 the shell 12 is reduced to provide an externally threaded plug portion 14 which is screwed into the associated bore in the body 1. The remainder of the shell 12 which extends inwardly from the portion 14 is of less diameter than the bore of the shell and provided with axially spaced annular flanges 15 supporting sealing rings 16. This construction defines an outer annular chamber 17 and an inner annular chamber 18 in the associated valve-receiving bore in the body member 1. The valve seat, for example seat 4j (shown in Fig. 4) is disposed at a point approximately centrally of the ends of the bore of the shell 12 and this defines an outer chamber 17' and an inner chamber 18' in said bore. Chamber 17' is afforded communication with chamber 17 through ports 19 in the shell 12 when the valve is unseated as well as seated. Chamber 18' is afforded communication with chamber 18 by means of ports 20 in the shell 12 but no flow takes place unless the valve is unseated.

The intercommunicating port 9 in body member 1, as shown in Figs. 1 and 3, leads from the outer chamber 17 in the bore 3 for the valve 3h, diagonally downward into the inner chamber 18 in the bore 2 for the valve 2d, where the other intercommunicating port 10 leads from the outer chamber 17 (as shown in Fig. 4) of the bore 4 into the inner chamber 18 in the bore 5. As shown in Figs. 4 and 5 return port 3c leads from inner chamber 18 of the bore 3 in the body 1 into the line connection 3d, whereas the return port 4c leads (as shown in Fig. 5) from the inner chamber 18 of bore 4 into the line connection 4d.

The poppet valves hereof are provided with stems 22 having piston-like guides 23 on their inner ends constructed and arranged to have working and sealing fit with the inner end portions of the bores through the shells 12. The guides 23 are exposed to the chamber 7 for cooperation with the valve operating means 8. Springs 24 in the shells 12 are engaged between annular keepers 25 and the outer sides of the poppet valves to hold said valves seated.

The valve operating means 8 in the chamber 7, as shown in Figs. 4, 6 and 7, includes a tubular rock shaft 26 rotatable on a bearing pin 27 which extends across said chamber, said shaft having a crank arm 28 intermediate its ends connected by means of links 29 to a screw 30 turned into the armature 31 of a solenoid S. This solenoid is contained in a housing 32 bolted as at 33 to the valve body member 1. A spring keeper 34 is supported by the head 35 of the screw 30 and is engaged by one end of a spring 36 to normally hold the armature 31 in an up position and certain valves open as will be hereinafter described.

On the rock shaft 26 are corresponding rocker arms 37 and 38 which extend as shown in Fig. 7 to the right of the shaft and are disposed to contact the piston-like ends 23 of the stems 22 for the poppet valves 3h and 5d respectively as further shown in Fig. 6. Other corresponding rocker arms 39 and 40, diametrically opposite arms 37 and 38 respectively and extending as shown in Fig. 7 to the left of the shaft 26, will contact the ends 23 of the stems of the valves 2d and 4h in the same manner as indicated for valves 3h and 5d in Fig. 6.

It is now seen that valves 3h and 5d are simultaneously correspondingly seated and unseated and that valves 2d and 4h are likewise simultaneously correspondingly actuated; the arrangement being such that while valves 3h and 5d are opened, valves 2d and 4h will be closed and vice versa, there being no neutral position of these valves.

Referring to the schematic views in Figs. 8 and 9, it is seen that the solenoid S is adapted to be connected in a normally open electric circuit 42 in such manner that only when a movable contact member 43 of a circuit closer reaches predetermined positions and engages either of two fixed contact members 44 and 45, will the circuit be closed and the solenoid operated to shift the poppet valves to reverse the flow of operating fluid to the motor M.

In a manner which it is not deemed essential to disclose and which will be understood by those skilled in this art, the contact member 42 is geared and arranged to move in one direction when the motor M is rotated clockwise and in another direction when the motor is rotated counter-clockwise, and when said member reaches predetermined positions it will engage the contacts 44 and 45 and momentarily reverse the flow of hydraulic fluid to the motor thereby reversing the motor.

Referring now to Fig. 8, it is seen that the control valve C is set to direct the operating fluid to operate the motor M in a counter-clockwise direction (see arrows on valve C) and that the poppet valves in my reversing valves are in their normal position as when the solenoid is de-energized, valves 3f and 5a being opened and valves 2d and 4h being closed. Pressure fluid now flows as indicated by the arrows from pump P, line 2c, control valve C, lines 2b and 5b, port 5a past open valve 5d, chambers 18' and 18 (see Fig. 4) in bore 5, port 10, chambers 17 and 17' of the bore 4, motor port 4a, line 4b (Fig. 8) to motor M. Return fluid flows at this time from motor M as shown by arrows in Fig. 8 through line 3b, motor port 3a past open valve 3h in bore 3, return port 3c, line 3e, line 4f, control valve C and line 4g to pump P.

As the motor M now turns clockwise, the contact member 43, which as hereinbefore noted, will be moved to the right. Assuming the motor M is set up to swing a gun turret or mount, for example to the right or clockwise when the motor is operated counter-clockwise, and the contact arm 43 is arranged to move to the right responsive to the turret movement, it is seen that when the turret and arm reach a predetermined position assumed to be the safe limit of movement of the gun in that direction, then the contact arm 43 will engage the contact 44 and close the circuit for the solenoid S. Immediately the solenoid is energized, the armature 31 is retracted and rocks the rock shaft 26 so as to lift and open valves 2d and 4h and at the same time close valves 3h and 5d, thereby reversing the flow of operating fluid as shown in Fig. 9.

With the flow of fluid reversed as shown in Fig. 9, the flow follows the arrow indicated path from pump P, line 2c, valve C, line 2b, port 2a, past open valve 2d, lower chambers 18' and 18 in bore 2, port 9, upper chambers 17 and 17' in bore 3, motor port 3a and line 3b to motor. Return flow from the motor M at this time passes through line 4b, port 4a in bore 4, past open valve 4h, lower chambers 18' and 18 in bore 4, return port 4c (see Fig. 5) line 4e, line 4f, valve C, and line 4g to the pump P.

As soon as the motor M is reversed as shown in Fig. 9 the contact member 43 begins to move to the left of contact 44 and immediately it breaks contact, the solenoid circuit is opened. The dotted position of member 42 in Fig. 9 shows the approximate point at which the solenoid becomes de-energized and when this takes place the spring lifts the armature 31 and opens valves 3h, and 5d, and closes valves 2d and 4h as shown in Fig. 8, thereby again reversing the motor and returning the contact 43 to engagement with contact 44 and energizing the solenoid so that it will again set the poppet valves as shown in Fig. 9 and repeat this operation whereby the motor and member 42 are oscillated within a small range of movement. This oscillation will continue until the 4-way control valve C is either moved to neutral position or reversed to position shown in Fig. 10 at which time it will provide for flow of fluid to rotate motor and turret clockwise also move the member 42 to the left, toward contact 45.

When control valve C is set as shown in Fig. 10 to cause the motor M to rotate clockwise (see arrows on valve C), the operating fluid from pump P flows through line 2c, line 4f, line 3e, port 3c, past open valve 3h, port 3a, line 3b to the motor. Fluid is now returned from the motor through line 4b, port 4a, port 10, past open valve 5d, through port 5a, line 5b, line 2b, valve C, and line 4g to the motor.

The arm 43 moves to the left and upon encountering the contact member 45 closes circuit 42 for the solenoid S and rocks the rock shaft 26 so that valves 2d and 4h will be opened while valves 3h and 5d are closed as shown in Fig. 11. The flow of operating fluid is now reversed and as shown in Fig. 11 passes from pump P through line 2c, valve C, line 4f, line 4e, port 4c, past open valve 4h, port 4a, line 4b to the motor, thus rotating the motor counter-clockwise. Fluid now returns from motor M, as shown in Fig. 11, through line 3b, port 3a, port 9 past open valve 2d, port 2a, line 2b, valve C and line 4g to the pump P.

As soon as the motor reverses (as shown in Fig. 11), the contact arm 43 is moved out of contact with contact 45 as indicated for example by the dotted showing of said arm, and opens the circuit for the solenoid, whereby the poppet valve will assume the position shown in Fig. 10, thereby again rotating the motor clockwise and causing arm 43 to again engage contact 45 whereby the solenoid will operate to reverse the flow of hydraulic fluid. This momentary reversing action will continue and effect a small vibratory or oscillatory movement of the gun turret and arm 43 for the purposes hereinbefore noted until the valve C is reversed or moved to neutral position.

While I have shown and described a specific embodiment of my invention I do not limit myself to the exact details of construction set forth, and the invention embraces such changes, modifications and equivalents of the parts and their formation and arrangement as come within the purview of the appended claim.

I claim:

In a flow reversing valve for a hydraulic system, a body member having four valve-receiving bores therein, a seat member and a poppet valve member mounted in each of said bores and defining therein on opposite sides of the valve member inner and outer chambers, each of said seat members being tubular and open at its outer end to provide a port for conducting hydraulic fluid to and from its outer chamber, a valve seat in each seat member between the inner and outer chambers therein, a stem on each of said valve members extending through the associated inner chamber and beyond the inner end of the associated seat member, a guide member on each stem having a working fit in and closing the inner end of its associated inner chamber, a port leading from an outer surface of said body member to the inner chamber of each bore of one pair of said bores for conducting fluid to and from the inner chambers therein, intercommunicating ports between the outer chambers in said one pair of bores and the inner chambers in the other pair of bores, and operating means for holding the valve members in and returning them to a normal position in which a valve member in one of the bores of said first named pair and a valve member in one of the bores of the other pair are held unseated while the other valve members are seated, and other operating means which when operated actuates said first named operating means to close the normally unseated pair of valve members and unseat the normally seated pair of valve members and when inoperative permit said first named operating means to return the valves to their normal position.

OTTMAR A. KEHLE.

(References on following page)

REFERENCES CITED

The following references are of record in the file of this patent:

UNITED STATES PATENTS

| Number | Name | Date |
|---|---|---|
| 2,121,548 | Lynn | June 21, 1938 |
| 2,275,963 | Herman | Mar. 10, 1942 |
| 883,123 | Wade | Mar. 24, 1941 |
| 2,240,163 | Pick | Apr. 29, 1941 |
| 2,232,038 | Stone | Feb. 18, 1941 |
| 926,142 | Schodde | June 29, 1909 |
| 1,956,775 | Ross | May 1, 1934 |

FOREIGN PATENTS

| Number | Country | Date |
|---|---|---|
| 366,101 | Italy | Dec. 19, 1938 |
| 206,387 | Switzerland | Nov. 16, 1939 |